US012552381B2

(12) United States Patent
Prasad (10) Patent No.: US 12,552,381 B2
(45) Date of Patent: Feb. 17, 2026

(54) TARGET OF INTEREST SELECTION ON ROADWAY RAMPS FOR AVOIDANCE DRIVING MANEUVERS

(71) Applicant: Aptiv Technologies AG, Schaffhausen (CH)

(72) Inventor: Premchand Krishna Prasad, Westfield, IN (US)

(73) Assignee: Aptiv Technologies AG, Schaffhausen (CH)

( * ) Notice: Subject to any disclaimer, the term of this patent is extended or adjusted under 35 U.S.C. 154(b) by 465 days.

(21) Appl. No.: 17/808,173

(22) Filed: Jun. 22, 2022

(65) Prior Publication Data

US 2023/0415741 A1    Dec. 28, 2023

(51) Int. Cl.
*B60W 30/14*    (2006.01)
*B60W 30/16*    (2020.01)
*B60W 40/06*    (2012.01)
*B60W 40/076*   (2012.01)

(52) U.S. Cl.
CPC ....... *B60W 30/162* (2013.01); *B60W 2552/05* (2020.02); *B60W 2552/10* (2020.02); *B60W 2556/40* (2020.02); *B60W 2720/10* (2013.01); *B60W 2754/30* (2020.02); *B60W 2754/50* (2020.02)

(58) Field of Classification Search
CPC .......... B60W 30/162; B60W 2552/05; B60W 2552/10; B60W 2556/40; B60W 2720/10; B60W 2754/30; B60W 2754/50; B60W 2556/50; B60W 30/16; B60W 40/06; B60W 30/14; B60W 30/18009; B60W 40/076; B60W 2552/15

USPC .......................................................... 701/96
See application file for complete search history.

(56) References Cited

U.S. PATENT DOCUMENTS 5,926,126 A    7/1999  Engelman
7,260,465 B2   8/2007  Waldis et al.
(Continued)

FOREIGN PATENT DOCUMENTS

JP    2004341941 A  *  12/2004

OTHER PUBLICATIONS

European Search Report regarding European Patent Application No. 23165461.7, dated Nov. 28, 2023.

*Primary Examiner* — Jelani A Smith
*Assistant Examiner* — George A Alcorn, III
(74) *Attorney, Agent, or Firm* — Harness, Dickey & Pierce, P.L.C.

(57) ABSTRACT

This document describes techniques and systems for target of interest selection on roadway ramps. When a host vehicle transitions from a roadway to a ramp, a quantity of lanes of the ramp is determined from a map stored in a driving system of the host vehicle. If there are multiple lanes, then a standard driving scheme may be employed. This standard driving scheme may prioritize a target directly in front of the host vehicle to be a target of interest. However, if the ramp has a single lane, a first target leading the host vehicle, but not necessarily directly in front of the host vehicle is determined to be the target of interest. Driving systems, such as adaptive cruise control, may base driving decisions on the target of interest. By determining the target of interest in this manner, uncertainty due to predictions and complexity of calculations may be reduced.

20 Claims, 8 Drawing Sheets

(56) References Cited

U.S. PATENT DOCUMENTS

| | | | |
|---|---|---|---|
| 2003/0204299 A1* | 10/2003 | Waldis | B60K 31/0058 |
| | | | 123/352 |
| 2005/0240330 A1 | 10/2005 | Heinrichs-Bartscher | |
| 2010/0198478 A1* | 8/2010 | Shin | B60W 10/06 |
| | | | 701/96 |
| 2015/0100228 A1 | 4/2015 | Sudou et al. | |
| 2020/0290619 A1* | 9/2020 | Mehdi | B60W 40/04 |
| 2020/0361489 A1 | 11/2020 | Park et al. | |
| 2021/0012661 A1* | 1/2021 | Yang | G08G 1/167 |
| 2022/0169310 A1* | 6/2022 | Choi | B62D 15/029 |

* cited by examiner

TARGET OF INTEREST SELECTION ON ROADWAY RAMPS FOR AVOIDANCE DRIVING MANEUVERS

BACKGROUND

Autonomous and semi-autonomous vehicles (e.g., host vehicles) are becoming more common. Such vehicles may employ sophisticated sensors (e.g., camera sensors, radar sensors, light detection and ranging (LiDAR) sensors) and systems (e.g., adaptive cruise control (ACC) systems, automatic emergency braking (AEB) systems) that make or assist a driver in making driving maneuvers based on targets (e.g., other vehicles, pedestrians, stationary objects) in the environment of these vehicles. Targets directly in front of a host vehicle are generally prioritized over targets that are ahead but not directly in front of the host vehicle. In some driving situations (e.g., a curved roadway), it may be preferable to prioritize a target that is ahead of the host vehicle but not directly in front of the host vehicle.

SUMMARY

This document describes techniques and systems for target of interest selection on roadway ramps. When a host vehicle transitions from a roadway to a ramp, a quantity of lanes of the ramp is determined from a map stored in a driving system of the host vehicle. If there are multiple lanes, then a standard driving scheme may be employed. This standard driving scheme may prioritize a target directly in front of the host vehicle to be a target of interest. However, if the ramp has a single lane, a first target leading the host vehicle, but not necessarily directly in front of the host vehicle is determined to be the target of interest. Driving systems, such as adaptive cruise control, may base driving decisions on the target of interest. By determining the target of interest in this manner, uncertainty due to predictions and complexity of calculations may be reduced.

In one example, a system includes at least one processor configured to determine if a host vehicle is traveling on a ramp of a roadway, the ramp being an on-ramp or an off-ramp. The at least one processor is further configured to responsive to determining that the host vehicle is traveling on the ramp, determine a quantity of lanes of the ramp. The at least one processor is further configured to select, based on the quantity of lanes of the ramp, a target selection scheme from among two or more potential selection schemes to be used to track targets while the host vehicle is on the ramp. The at least one processor is further configured to determine, based on the selected target selection scheme, a target of interest leading the host vehicle on the ramp. The at least one processor is further configured to execute, based on the target of interest, one or more driving maneuvers of the host vehicle that assist in avoiding the target of interest.

These and other described techniques may be performed by hardware or a combination of hardware and software executing thereon. For example, a computer-readable storage media (CRM) may have instructions stored thereon and that when executed configure a processor to perform the described techniques. A system may include means for performing the described techniques. A method may be performed that executes the techniques described herein.

Through implementation of these and other examples contemplated by this disclosure, targets of interest may be safely selected while traveling along roadway ramps. This Summary introduces simplified concepts related to target of interest selection on roadway ramps, further described in the Detailed Description and Drawings. This Summary is not intended to identify essential features of the claimed subject matter, nor is it intended for use in determining the scope of the claimed subject matter.

BRIEF DESCRIPTION OF THE DRAWINGS

The details of target of interest selection on roadway ramps is described in this document with reference to the Drawings that may use same numbers to reference like features and components, and hyphenated numbers to designate variations of these like features and components. The Drawings are organized as follows:

FIG. 3-1 illustrates an example designation of targets used for target of interest selection, in accordance with techniques of this disclosure;

FIGS. 3-2 to 3-5 illustrate example driving scenarios in which target of interest selection on roadway ramps can be applied, in accordance with techniques of this disclosure.

DETAILED DESCRIPTION

Overview

Target selection is a key function for autonomous and semi-autonomous vehicles. Target selection prioritizes which target or targets (e.g., targets of interest) may be more likely to impact driving maneuvers of a host vehicle configured for autonomous or semi-autonomous driving. In most situations, a target that is immediately in front (e.g., in the same lane and/or lying on a longitudinal axis extending from a center point of the host vehicle and orthogonal to the front of the host vehicle) of the host vehicle will potentially have the most impact. Other targets that may be ahead of the host vehicle on a roadway but not in front of the host vehicle generally have less impact. For example, a host vehicle using an adaptive cruise control system (ACC) will generally maintain a set velocity unless a target vehicle is in front of or in the same lane as the host vehicle. That target vehicle becomes a target of interest, and the ACC will try to maintain a set distance behind the target of interest. Target vehicles in other lanes may not be considered by the ACC as a target of interest as those target vehicles are in less danger of being in a collision with the host vehicle.

It may be advantageous in some driving situations to select a target that is ahead of (e.g., leading) the host vehicle but not necessarily immediately in front of the host vehicle. One such situation is when the host vehicle travels along an on-ramp or an off-ramp (e.g., ramps, collectively) of a roadway. Many ramps are curved and may have one or more lanes. Additionally, they may have wide shoulders. As vehicles travel along a ramp, they may or may not stay in their original lane. Many times, the vehicles travel, at least partially, in the shoulder area (or median) due to either over-steering or under-steering as they traverse the curve of the ramp.

Many current advanced driving systems base target selection while traveling on ramps on heading and curvature information about the ramps. This method of target selection involves a certain amount of prediction and may not properly categorize vehicles that are in the shoulder areas. These shortcomings are most apparent in ramps with one lane.

In contrast, the techniques disclosed in this document do not depend on prediction. If a ramp is determined to have a single lane, then target selection is based on the first vehicle that is ahead but not necessarily directly in front of the host vehicle. Further, the quantity of lanes is determined from information included in a map (e.g., standard-definition map (SD map), high-definition map (HD map)) stored in the driving systems of the host vehicle. This method may reduce uncertainty due to predictions and complexity of any calculations involving headings and curvatures.

Example Environment

Figure 1:
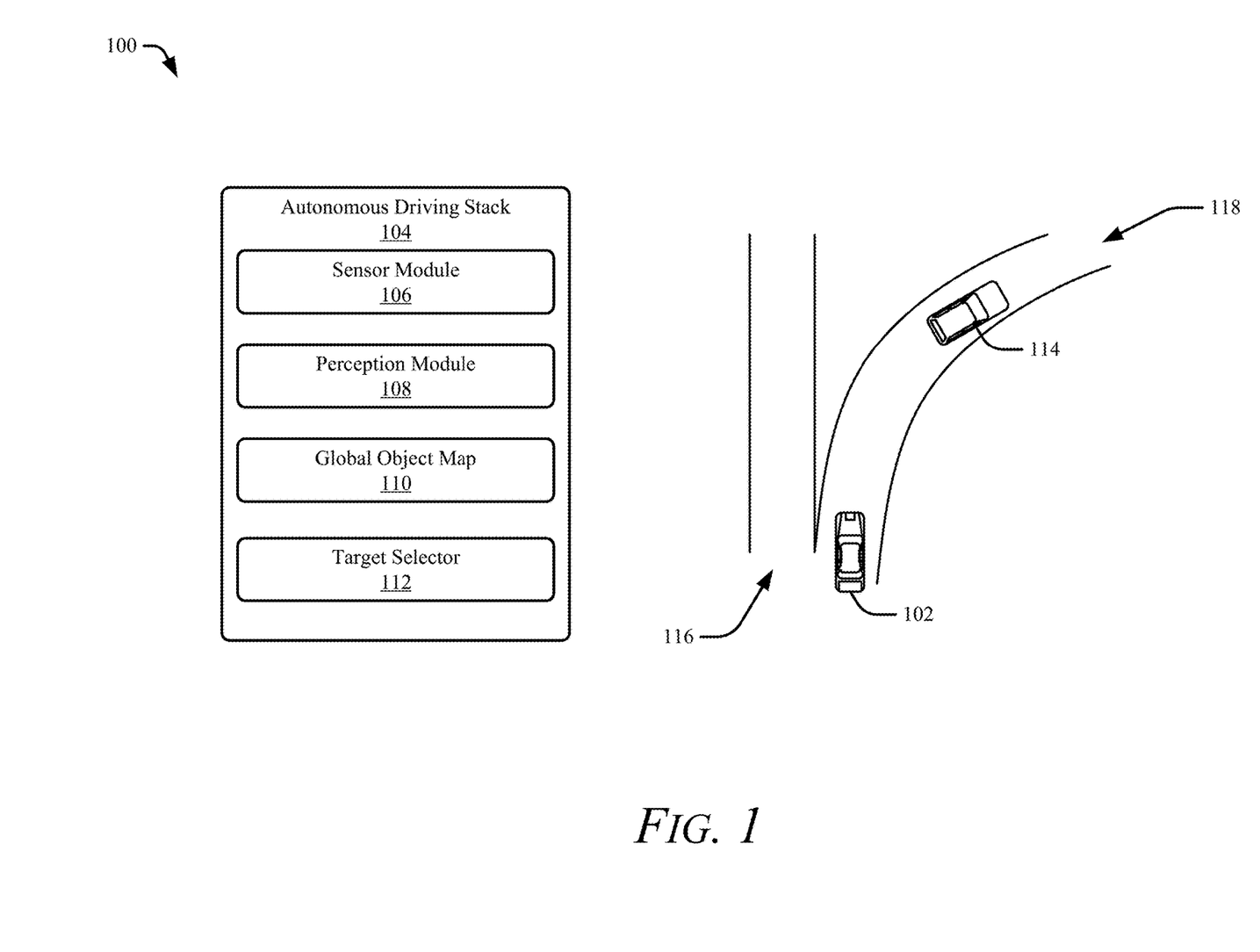
FIG. 1 illustrates an example environment in which target of interest selection on roadway ramps can be applied, in accordance with techniques of this disclosure.

FIG. 1 illustrates an example environment 100 in which target of interest selection on roadway ramps can be applied, in accordance with techniques of this disclosure. In the depicted environment 100, a host vehicle 102 includes an autonomous driving stack (AD stack) 104. Although illustrated as a car, the vehicle 102 can represent other types of vehicles and machinery (e.g., a motorcycle, a bus, a tractor, a semi-trailer truck, or other heavy equipment) including manned and unmanned systems that may be used for a variety of purposes.

The AD stack 104 can include a sensor module 106, a perception module 108, a global object map, 110, and a target selector 112. In other examples, the operations associated with the AD stack 104 can be performed using a different arrangement, combination, or quantity of components than that shown in FIG. 1. The sensor module 106 includes any sensors (e.g., cameras, radar, LiDAR, infra-red sensors, ultra-sonic sensors) mounted on or integrated within the host vehicle 102 that may be used to detect and/or track objects (e.g., targets) in the depicted environment 100. Data from the sensor module 106 is output to the perception module 108 that generates meaningful information related to the objects in the depicted environment 100. The output of the perception module 108, including fused sensor data, can then be organized into the global object map 110. The global object map 110 tracks any objects detected in the depicted environment 100. The target selector 112 can use the global object map 110 to assess and prioritize the objects as one or more targets of interest. The targets of interest are objects that may demand focus due to their location or actions in relation to the host vehicle 102. Driving systems, such as an ACC, can receive information about the targets of interest from the target selector 112 and execute driving maneuvers to safely navigate the host vehicle 102. These driving maneuvers may be executed by driving systems, such as an ACC, and include maintaining a set distance behind the target 114, maintaining a set velocity, or braking when the target 114 slows down. Generally, the target of interest may be a target immediately in front of the host vehicle 102 (see an example illustrated in FIG. 3 as host vehicle 302 and target T1 314) as both the host vehicle 102 and the target 114 travel a roadway 116.

As the target 114 and the host vehicle 102 transition from a roadway 116 to a ramp 118 (e.g., on-ramp, off-ramp), the AD stack 104 continues to sense, track, and make decisions about whether the target 114 is the target of interest. While in the curved portion of the ramp 118, the target 114 is still ahead (e.g., still leading) of the host vehicle 102; however, the target 114 is no longer directly in front of the host vehicle 102. To accommodate the change in relative position of the target 114 to the host vehicle 102, the target selector 112 can consult an onboard SD map or HD map that contains information about the quantity of lanes that the ramp 118 has. If the ramp 118 has a single lane, the target selector maintains target 114 as the target of interest, even though the target 114 is at angle relative to the heading of host vehicle 102. If the ramp has multiple lanes, the target selector 114 continues to determine a target of interest as it would traveling on roadway 116. In this manner, uncertainty over any predictions involved in determining the target of interest is reduced, especially on single lane ramps.

Example Systems

Figure 2:
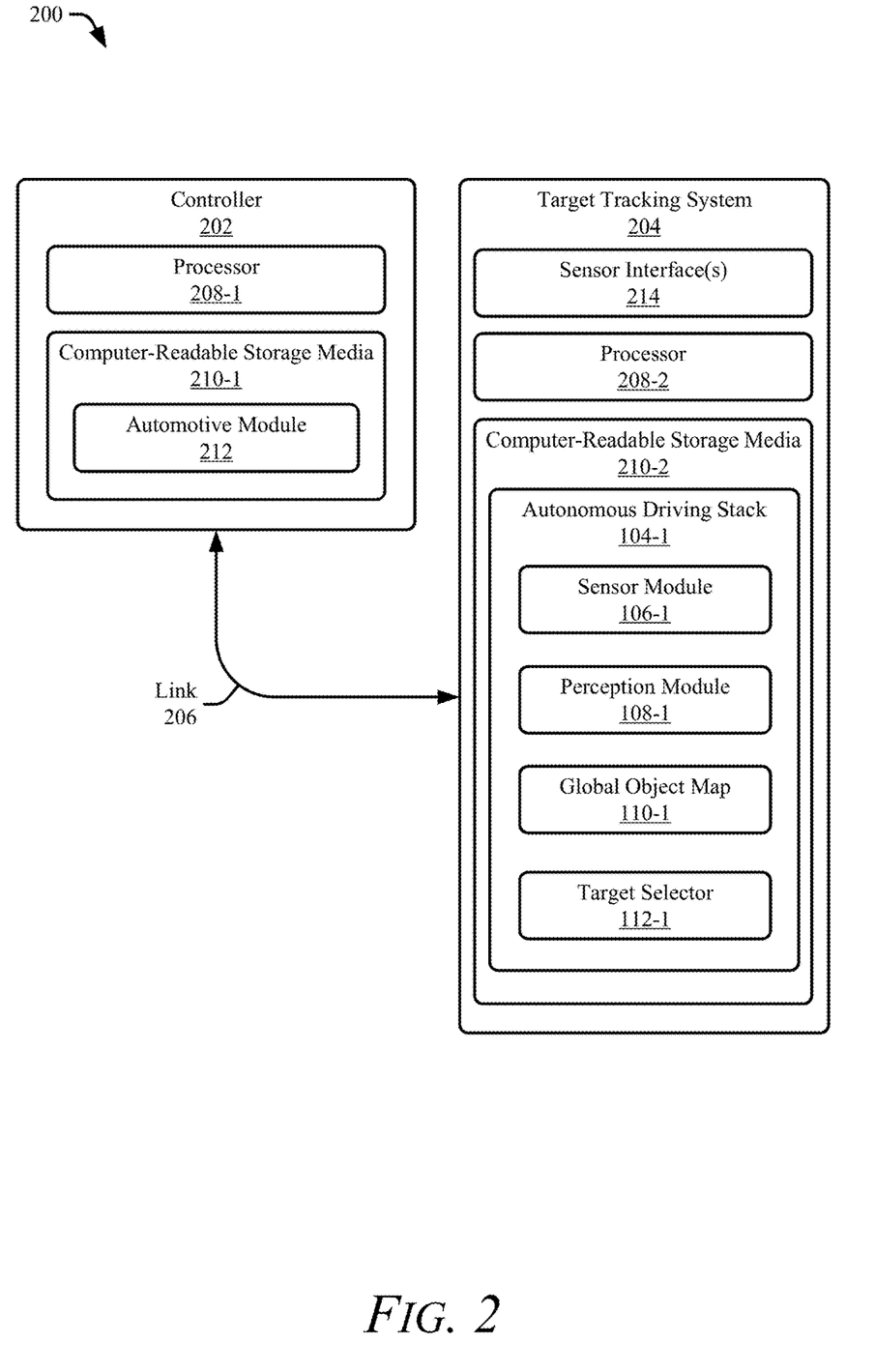
FIG. 2 illustrates an example of an automotive system configured for target of interest selection on roadway ramps, in accordance with techniques of this disclosure.

FIG. 2 illustrates an example of an automotive system 200 configured for target of interest selection on roadway ramps, in accordance with techniques of this disclosure. The automotive system 200 can be integrated within the host vehicle 102. For example, the automotive system 200 includes a controller 202 and a target tracking system 204. The target tracking system 204 can be integrated into an automotive or other vehicular environment. The target tracking system 204 and the controller 202 communicate over a link 206. The link 206 may be a wired or wireless link and in some cases includes a communication bus. The controller 202 performs operations based on information received over the link 206, such as data output from the target tracking system 204 as objects in a FOV of sensors integrated on the host vehicle 102 are identified from processing data obtained by the sensors.

The controller 202 includes a processor 208-1 and a computer-readable storage media (CRM) 210-1, which stores instructions for an automotive module 212. The automotive module 212 may include different vehicular systems such as ACC, AEB, and vehicle-to-vehicle systems. Other systems may also be included. The target tracking system 204 includes one or more sensor interfaces 214. The target tracking system 204 may also include processing hardware that includes a processor 208-2 and a computer-readable storage media (CRM) 210-2, which stores instructions associated with an AD stack 104-1 (e.g., the AD stack 104 illustrated in FIG. 1). An SD map or HD map that includes roadway and ramp lane information can be stored in CRM 210-1, 210-2, or another storage media integrated within the host vehicle 102. The map may also be accessed online through a cloud storage media or website.

The processors 208 can include, as non-limiting examples, a system on chip (SoC), an application processor (AP), an electronic control unit (ECU), a central processing unit (CPU), or a graphics processing unit (GPU). The processors 208 may be a single-core processor or a multiple-core processor implemented with a homogenous or heterogenous core structure. The processors 208 may include a hardware-based processor implemented as hardware-based logic, circuitry, processing cores, or the like. In some aspects, functionalities of the processors 208 are provided via an integrated processing, communication, and/or control system (e.g., SoC), which may enable various operations of the vehicle 102 in which the system is embodied. The CRMs 210 (e.g., transitory storage, non-transitory storage, cloud storage) may include any suitable memory or storage device such as random-access memory (RAM), static RAM (SRAM), dynamic RAM (DRAM), non-volatile RAM (NVRAM), read-only memory (ROM), or flash memory useable to store device data.

The AD stack 104-1 includes a sensor module 106-1, a perception module 108-1, a global object map 110-1, and a target selector 112-1. The sensor module 106-1 outputs data received from the sensor interface(s) 214 to the perception module 108-1. The perception module 108-1 processes this data into information that can be used to detect and track targets in the vicinity of the host vehicle 102. This information may include object tracks or fused object tracks and other information relative to the objects about the host vehicle 102. This information is projected onto the global object map 110-1. The global object map 110-1 maps the objects in the environment 100 of the host vehicle 102. The target selector 112-1 analyzes the global object map and selects targets of interest from the objects that are communicated to the automotive module 212. For example, if the host vehicle 102 transitions to a ramp, the target selector 112-1 determines the quantity of lanes of the ramp based on the SD map or HD map. Based on the quantity of lanes, the target selector 112-1 selects an object (if a candidate object exists) from the global object map 110-1 to be the target of interest. If the ramp has one lane, then the target of interest would be the immediate leading target in relation to the host vehicle 102. This target of interest may not touch the longitudinal axis of the host vehicle. That is, the target of interest may be further around the curve of the ramp such that it does not lie on the path of the instantaneous heading of the host vehicle 102. If the ramp has multiple lanes, the target selector 112-1 chooses the target of interest as if the host vehicle is not traveling on a ramp. By selecting the target of interest in this manner, the target selector 112-1 does not rely on predictions, heading, or curvature calculations when the host vehicle 102 is on a single lane ramp.

Example Implementations

Figure 31:
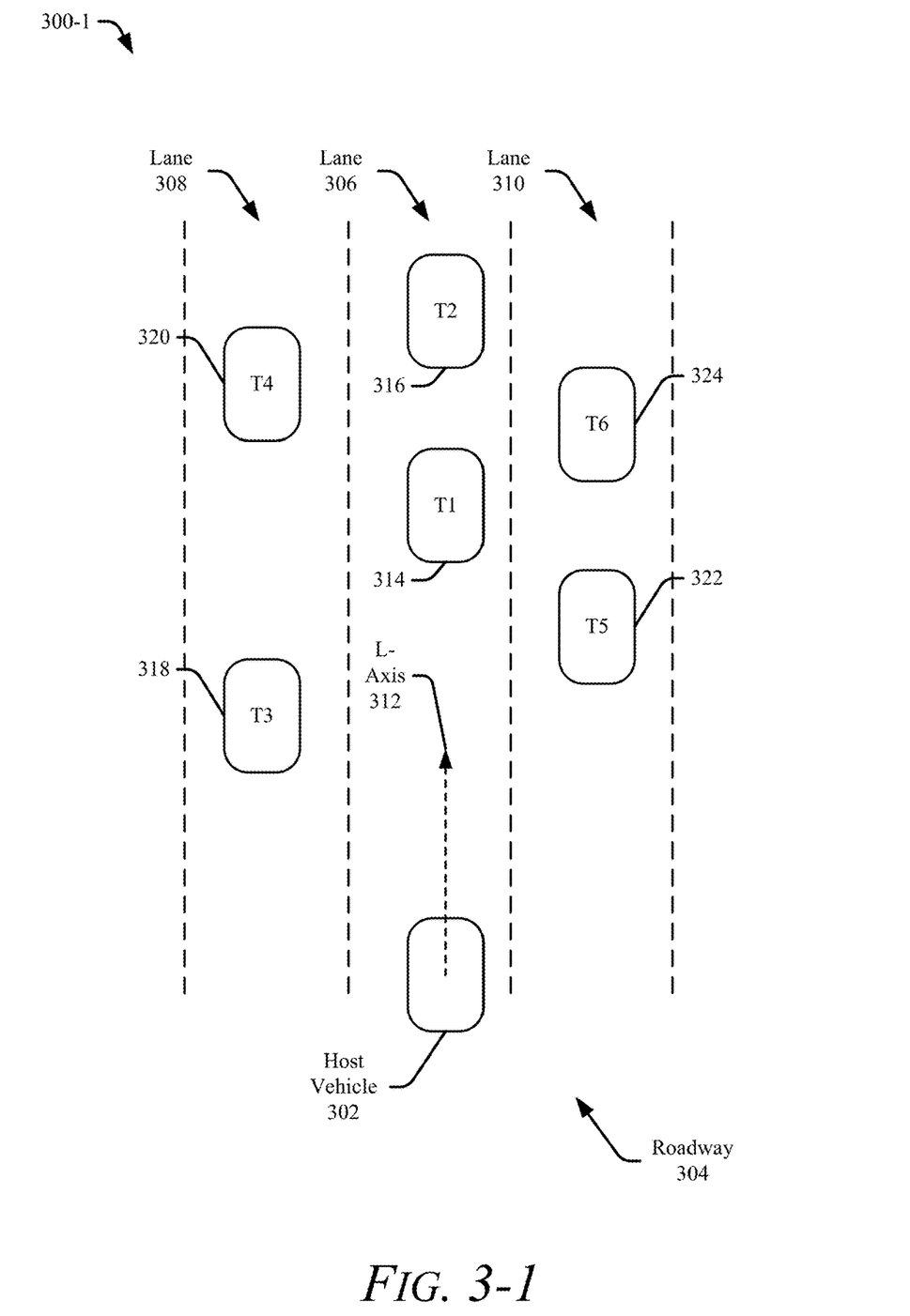
Figure 32:
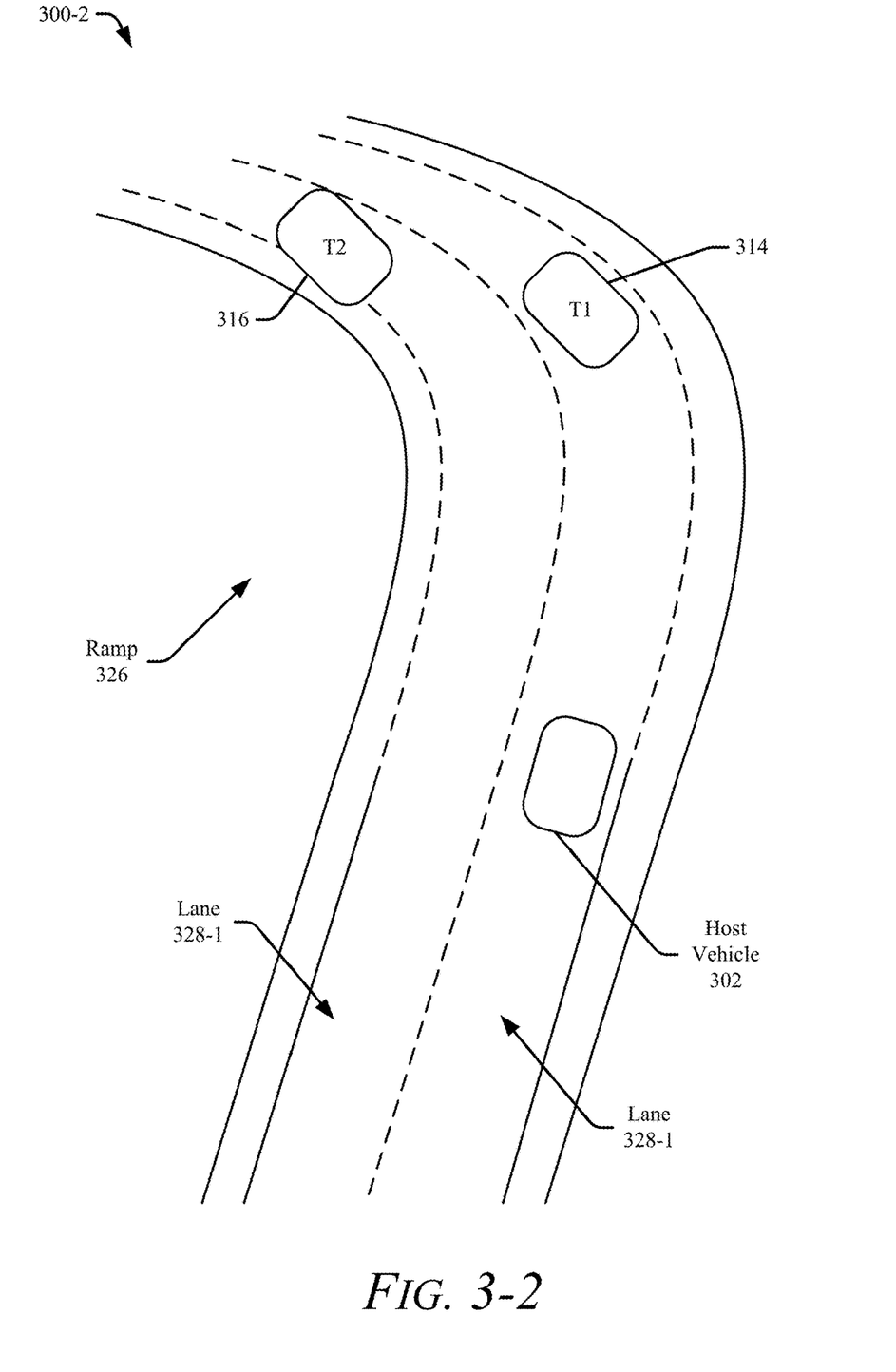

FIG. 3-1 illustrates an example designation 300-1 of targets used for target of interest selection, in accordance with techniques of this disclosure. A host vehicle 302 (e.g., the host vehicle 102) travels a roadway 304 that has a lane 306, a lane 308, and a lane 310. The host vehicle 302 is traveling in lane 306. A longitudinal axis 312 of the host vehicle represents the heading of the host vehicle 302. Immediately in front of the host vehicle 302 (and in the same lane) is a target T1 314. T1 314 lies on the path of the heading of the host vehicle 302. A target T2 316 is in front of the T1 314. Traveling in lane 308 is a target T3 318 that is ahead of the host vehicle 302 but is at an angle relative to the longitudinal axis 312. That is, the T3 318 is not on the path of the heading of the host vehicle 302. Traveling in front of the T3 318 and in lane 308 is a target T4 320. Similarly, a target T5 322 and a target T6 324 travel in lane 310.

A general target selection scheme may assign the T1 314 as a target of interest for the host vehicle 302. This is because the T1 314 is in the same lane and/or directly in front of the host vehicle 302. The T1 314 is in the path of the host vehicle 302, and, therefore, systems such as an ACC can focus on the T1 314 for indications of speed changes and/or braking by the T1 314. The ACC does not focus on the other targets (T2 316 through T6 324) because those targets are less likely to impact the driving maneuvers that the ACC executes.

FIGS. 3-2 to 3-5 illustrate example driving scenarios in which target of interest selection on roadway ramps can be applied, in accordance with techniques of this disclosure. FIG. 3-2 illustrates a driving scenario 300-2 where the T2 316, the T1 314, and the host vehicle 302 have transitioned to a ramp 326 with multiple lanes 328-1 and 328-2. Before transitioning to the ramp 326, according to the general target selection scheme introduced above, the T1 314 was assigned as the target of interest. Because the ramp 326 has the multiple lanes 328 as determined from a map accessed by the target selector module of the host vehicle 302, the general target selection scheme can be applied. The target selector module of the host vehicle 302 may make decisions concerning targets of interest in the same manner as if the host vehicle was on a roadway instead of a ramp.

Figure 33:
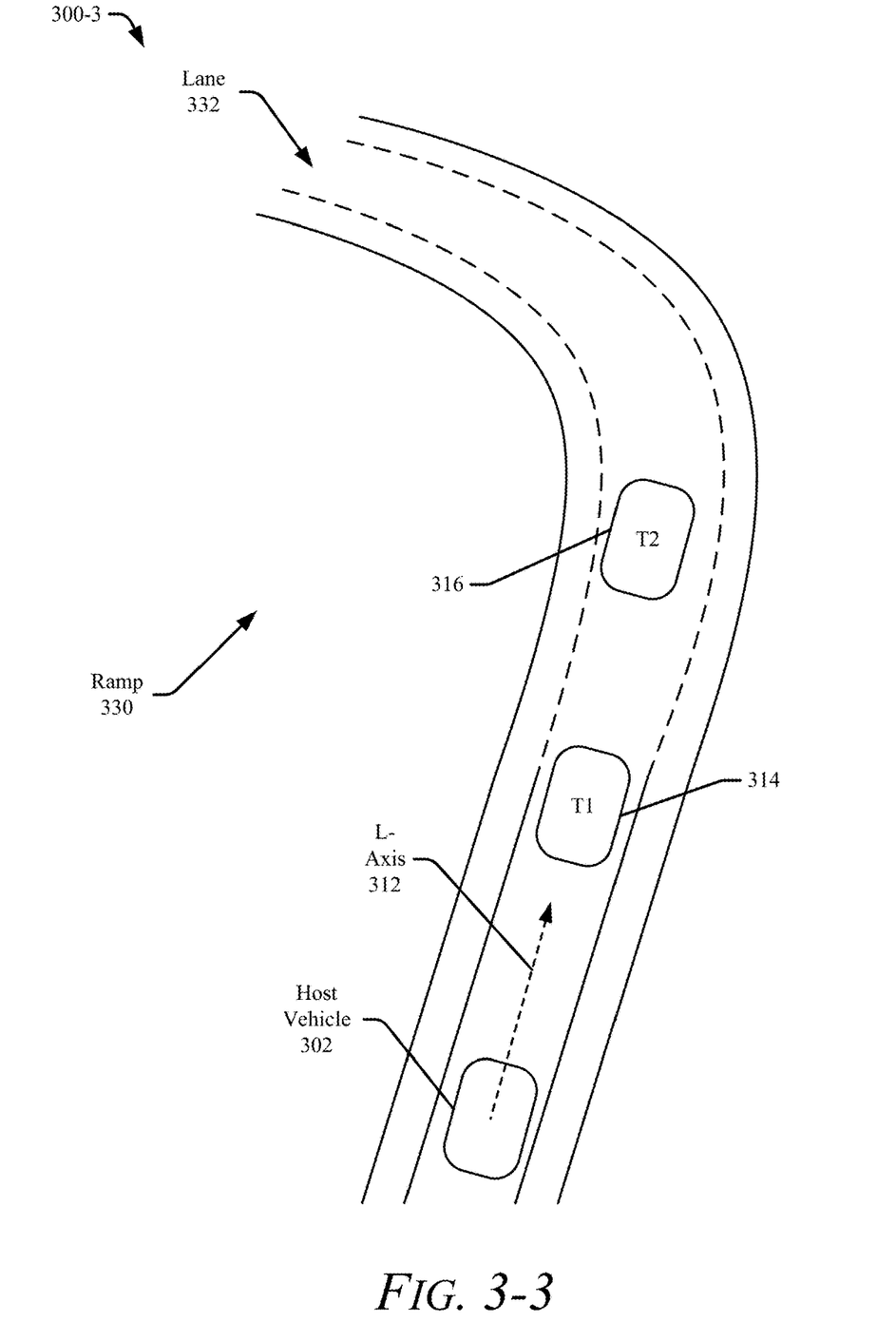
Figure 34:
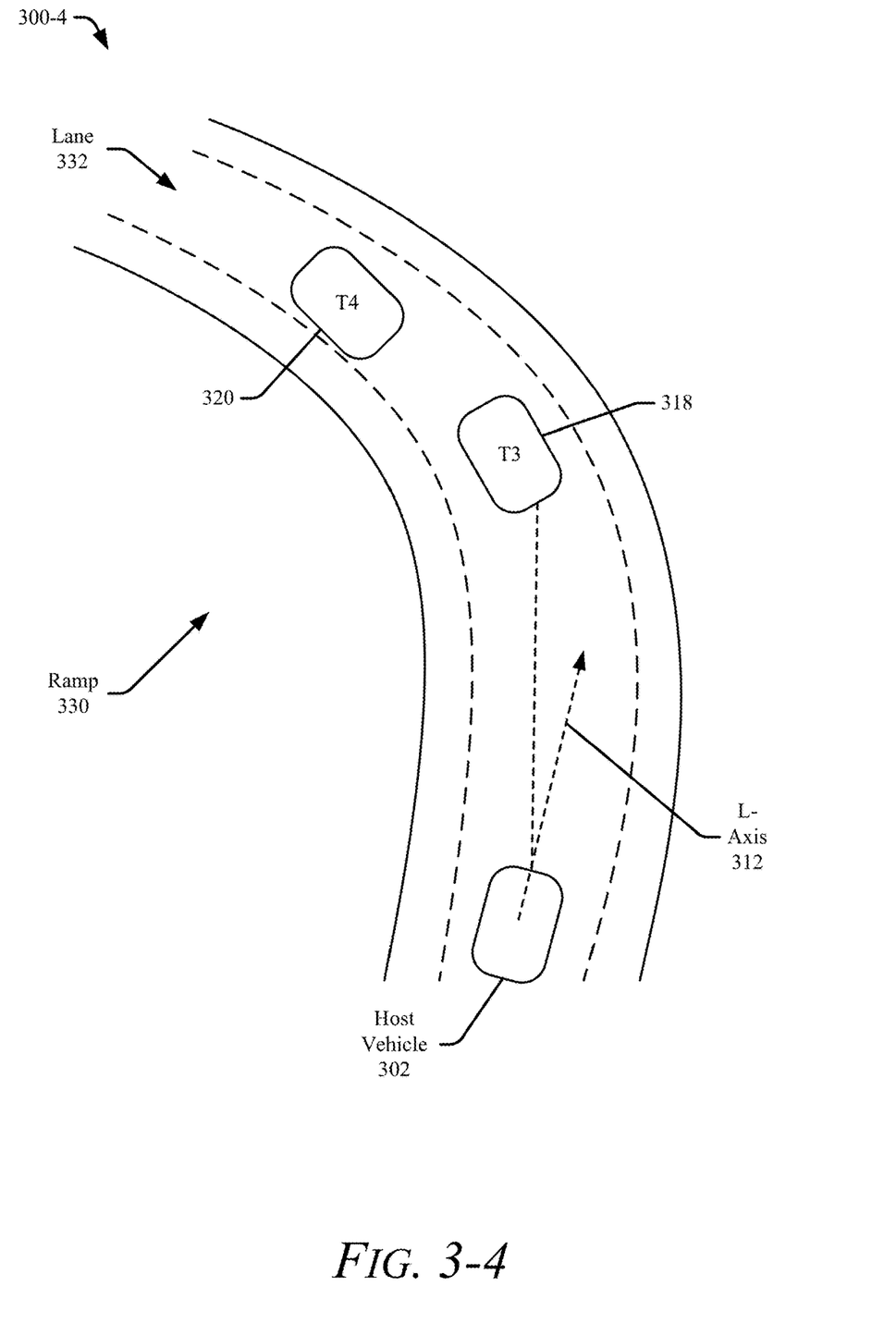
Figure 35:
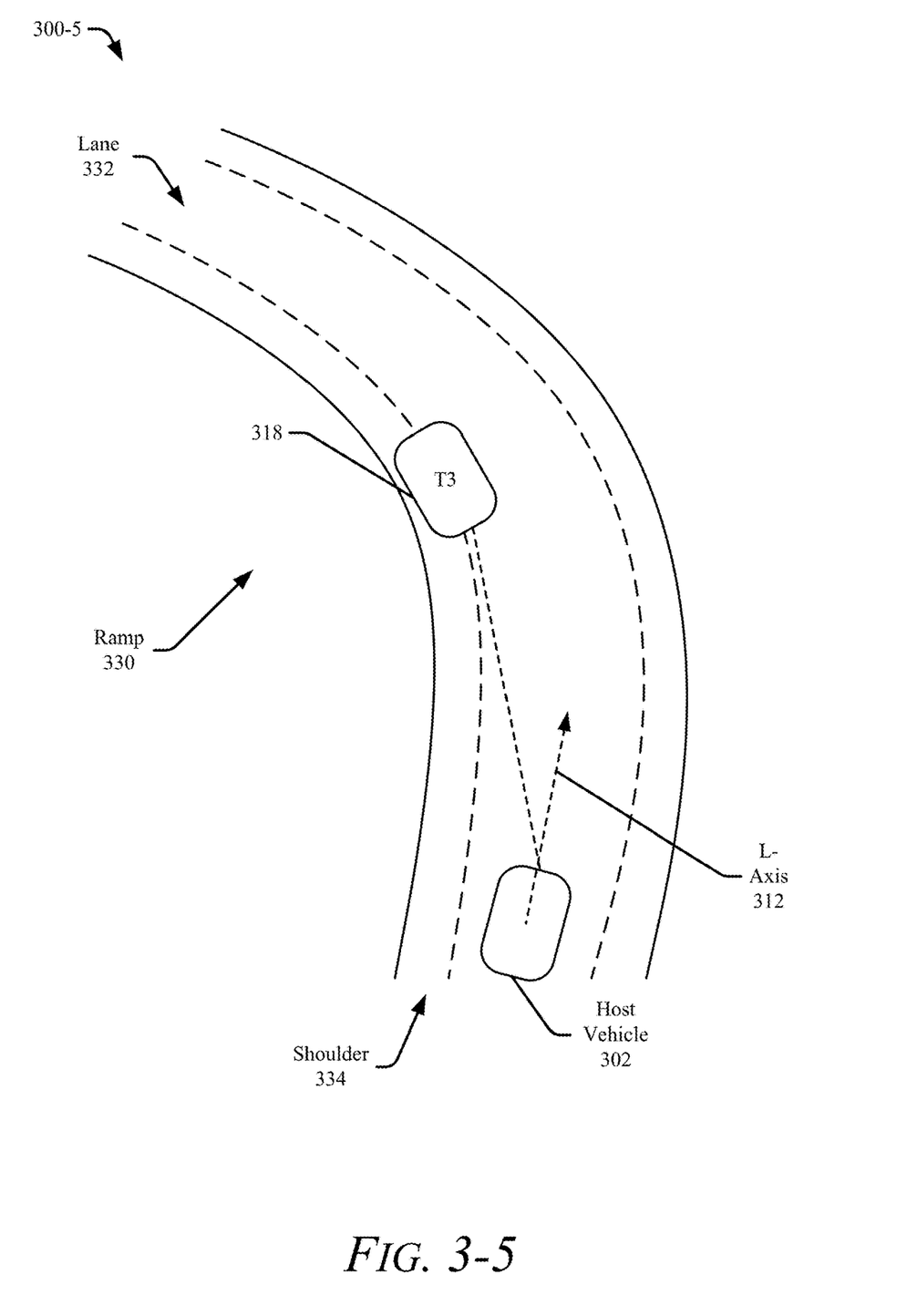

FIGS. 3-3 to 3-5 illustrate a driving scenario 300-3 where the T2 316, the T1 314, and the host vehicle 302 are traveling on a ramp 330 with a single lane 332. In FIG. 3-3, the T2 316, the T1 314, and the host vehicle 302 are traveling on a portion of the ramp that has no (or slight) curve. According to the general target selection scheme, the T1 314 would be assigned as the target of interest because the T1 314 is on the path of the heading as represented by the longitudinal axis 312 of the host vehicle 302. However, since the ramp 330 only has the one lane 332, a single-lane ramp target selection scheme is selected by the target selector module of the host vehicle 302. The T1 314 is chosen as the target of interest because the ramp 330 has the one lane 332 and not because the T1 314 lies in the path of the heading of the host vehicle 302. Once the host vehicle 302 exits the ramp 330, the general target selection scheme may again be used to determine targets of interest.

In a driving scenario 300-4 as illustrated in FIG. 3-4, the T1 314 and the T2 316 have entered a curve of the ramp and are now off the path of the heading of the host vehicle 302. The T1 314 and the T2 316 are now assigned as the T3 318 and the T4 320 as described according to FIG. 3-1, since the T3 318 and the T4 320 no longer lie on the path of the heading of the host vehicle 302. However, the single-lane ramp target selection scheme assigns the T3 318 as the target of interest because the T3 318 is immediately ahead of the host vehicle 302. Even if the ramp 330 ends at a stop indicator or merges into another roadway with slower traffic that causes the T3 318 to brake, the ACC of the host vehicle 302 can make a braking decision based on the T3 318. No predictions about which target, if any, should be the target of interest are made.

FIG. 3-5 illustrates a driving scenario 300-5 that is similar to the driving scenario 300-4. In the driving scenario 300-5, the T3 318 has over-steered through the curve of the ramp 330 and has drifted into a shoulder 334. According to the single-lane ramp target selection scheme, the T3 318 still retains the assignment as the target of interest. The target of interest designation is assigned solely based on the quantity of lanes on the ramp 330. Headings, curvature calculations, and predictions are not included in the decision process of the single-lane ramp target selection scheme. This may lead to the ACC (or other driving systems) of the host vehicle 302 to make better driving decisions leading to increased safety for the host vehicle 302 and the T3 318.

Example Methods

Figure 4:
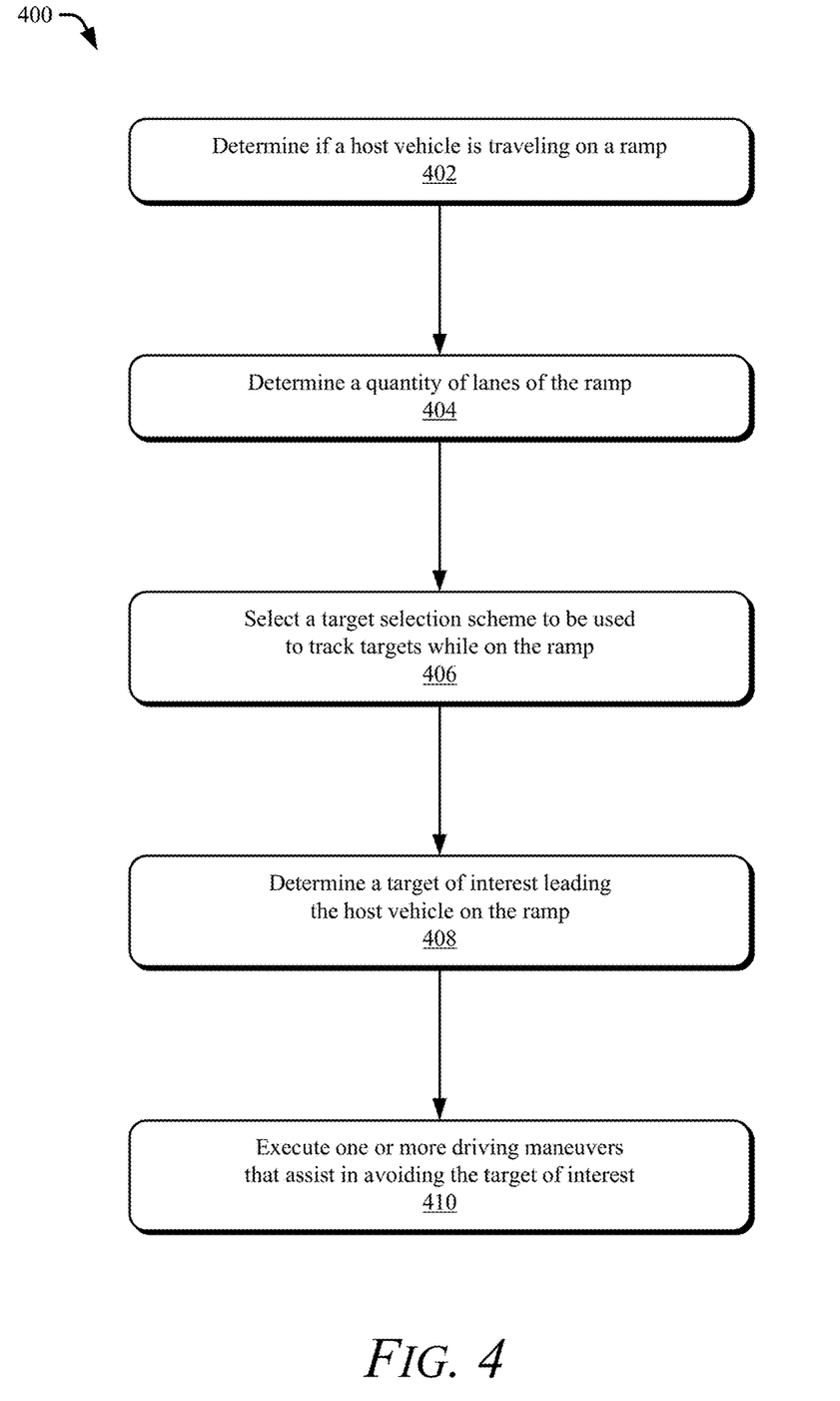
FIG. 4 illustrates an example method for target selection on roadway ramps, in accordance with techniques of this disclosure.

FIG. 4 illustrates an example method for target of interest selection on roadway ramps, in accordance with techniques of this disclosure. At step 402, whether a host vehicle is traveling on a roadway ramp is determined. The ramp may be an on-ramp or an off-ramp.

At step 404, in response to determining that the host vehicle is traveling on the ramp, a quantity of lanes of the ramp is determined. The ramp may have a single lane or multiple lanes. The ramp may also have a shoulder (or median) on either side. The quantity of lanes can be determined from an SD map or an HD map that the systems of the host vehicle can access. That is, the map can be stored locally in a CRM of the host vehicle, or it can be accessed online. The map includes information about the quantity of lanes that the ramp has.

At step 406, based on the quantity of lanes on the ramp, a target selection scheme from among two or more potential selection schemes is selected to be used while the host vehicle is on the ramp. A first target selection scheme that may be selected is a general target selection scheme. This target selection scheme is selected if the ramp has multiple lanes. A second target selection scheme that may be selected is a single-lane ramp target selection scheme. The single-lane ramp target selection scheme is selected if the ramp only has one lane.

At step 408, based on the selected target selection scheme, a target of interest that is leading the vehicle on the ramp is determined. If the general target selection scheme is selected, the target of interest is determined in the same manner as a target of interest would be determined on a roadway other than a ramp. This scheme may choose a target that is immediately in front of the host vehicle as the target of interest. That is, the target of interest is in the path of the heading of the host vehicle. If the single-lane target selection scheme is selected, the target of interest is determined based on whether the target is immediately leading the host vehicle on the ramp, regardless of whether the selected target is on or off the path of the heading of the host vehicle.

At step 410, one or more driving maneuvers are executed based on the target of interest. These driving maneuvers may include maintaining a set velocity, a set distance behind the target of interest, or braking based on the target of interest decreasing its velocity. The driving maneuvers may be performed by various driving systems of the host vehicle such as an ACC. In this manner, target of interest selection on roadway maps as described in this disclosure may reduce uncertainty due to predictions involved in selecting a target of interest and resulting in a safer driving experience while a host vehicle is on a single-lane ramp.

ADDITIONAL EXAMPLES

In the following section, examples are provided.

Example 1: A system comprising: at least one processor configured to: determine if a host vehicle is traveling on a ramp of a roadway, the ramp being an on-ramp or an off-ramp; responsive to a determination that the host vehicle is traveling on the ramp, determine a quantity of lanes of the ramp; select, based on the quantity of lanes of the ramp, a target selection scheme from among two or more potential selection schemes to be used to track targets while the host vehicle is on the ramp; determine, based on the selected target selection scheme, a target of interest leading the host vehicle on the ramp; and execute, based on the target of interest, one or more driving maneuvers of the host vehicle that assist in avoiding the target of interest.

Example 2: The system of example 1, wherein the one or more driving maneuvers comprise: maintaining a set distance behind the target of interest; maintaining, based on a velocity of the target of interest, a set velocity; or braking based on the velocity of the target of interest decreasing.

Example 3: The system of example 1, wherein: a first target selection scheme from the two or more potential selection schemes that configures the at least one processor to determine the target of interest by prioritizing the target that is immediately in front of the host vehicle, the target being in a path of a heading of the host vehicle; and a second target selection scheme from the two or more potential selection schemes that configures the at least one processor to determine the target of interest by prioritizing the target that is immediately ahead and either off or on the path of the heading of the host vehicle.

Example 4: The system of example 3, wherein the at least one processor is configured to: select the first target selection scheme from the two or more potential selection schemes if the quantity of lanes is determined to be two or more; or select the second target selection scheme if the quantity of lanes is determined to be one.

Example 5: The system of example 3, wherein the at least one processor is further configured to: responsive to the host vehicle exiting the ramp, select the first target selection scheme.

Example 6: The system of example 1, wherein the at least one processor is configured to determine the quantity of lanes based on information obtained from a map.

Example 7: The system of example 1, wherein the at least one processor is configured to execute the one or more driving maneuvers with an adaptive cruise control system.

Example 8: A computer-readable storage media comprising instructions that, when executed, configure at least one processor to: determine if a host vehicle is traveling on a ramp of a roadway, the ramp being an on-ramp or an off-ramp; responsive to a determination that the host vehicle is traveling on the ramp, determine a quantity of lanes of the ramp; select, based on the quantity of lanes of the ramp, a target selection scheme from among two or more potential selection schemes to be used to track targets while the host vehicle is on the ramp; determine, based on the selected target selection scheme, a target of interest leading the host vehicle on the ramp; and execute, based on the target of interest, one or more driving maneuvers of the host vehicle that assist in avoiding the target of interest.

Example 9: The computer-readable storage media of example 8, wherein the one or more driving maneuvers comprise: maintaining a set distance behind the target of interest; maintaining, based on a velocity of the target of interest, a set velocity; or braking, based on the velocity of the target of interest decreasing.

Example 10: The computer-readable storage media of example 8, wherein the instructions include: a first target selection scheme from the two or more potential selection schemes that configures the at least one processor to determine the target of interest by prioritizing the target that is immediately in front of the host vehicle, the target being in a path of a heading of the host vehicle; and a second target selection scheme from the two or more potential selection schemes that configures the at least one processor to determine the target of interest by prioritizing the target that is immediately ahead and either off or on the path of the heading of the host vehicle.

Example 11: The computer-readable storage media of example 10, wherein the instructions, when executed, configure the at least one processor to: select the first target selection scheme if the quantity of lanes is determined to be two or more; or select the second target selection scheme if the quantity of lanes is determined to be one.

Example 12: The computer-readable storage media of example 10, wherein the instructions, when executed, further configure the at least one processor to: responsive to the host vehicle exiting the ramp, select the first target selection scheme.

Example 13: The computer-readable storage media of example 8, wherein the instructions, when executed, configure the at least one processor to determine the quantity of lanes based on information obtained from a map.

Example 14: The computer-readable storage media of example 8, wherein the instructions, when executed, configure the at least one processor to execute the one or more driving maneuvers with an adaptive cruise control system.

Example 15: A method comprising: determining if a host vehicle is traveling on a ramp of a roadway, the ramp being an on-ramp or an off-ramp; responsive to a determination that the host vehicle is traveling on the ramp, determining a quantity of lanes of the ramp; selecting, based on the quantity of lanes of the ramp, a target selection scheme from among two or more potential selection schemes to be used to track targets while the host vehicle is on the ramp; determining, based on the selected target selection scheme, a target of interest leading the host vehicle on the ramp; and executing, based on the target of interest, one or more driving maneuvers of the host vehicle that assist in avoiding the target of interest.

Example 16: The method of example 15, wherein the one or more driving maneuvers comprise: maintaining a set distance behind the target of interest; maintaining, based on a velocity of the target of interest, a set velocity; or braking based on the velocity of the target of interest decreasing.

Example 17: The method of example 15, wherein the target selection scheme comprises one of: a first target selection scheme from the two or more potential selection schemes that determines the target of interest by prioritizing the target that is immediately in front of the host vehicle, the target being in a path of a heading of the host vehicle; or a second target selection scheme from the two or more potential selection schemes that determines the target of interest by prioritizing the target that is immediately ahead and either off or on the path of the heading of the host vehicle.

Example 18: The method of example 17, wherein selecting the target selection scheme comprises: selecting the first target selection scheme if the quantity of lanes is determined to be two or more; or selecting the second target selection scheme if the quantity of lanes is determined to be one.

Example 19: The method of example 15, wherein determining the quantity of lanes is based on information obtained from a map.

Example 20: The method of example 15, wherein the one or more driving maneuvers is executed by an adaptive cruise control system.

Conclusion

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the spirit and scope of the disclosure as defined by the following claims. Problems associated with target of interest selection can occur in other systems. Therefore, although described as a way to select a target of interest on a roadway ramp, the techniques of the foregoing description can be applied to other systems that would benefit from target of interest selection that is not based on predictions. Further, these techniques may also be applied to other systems that experience situations that may not require predictions.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. A system comprising:
   at least one processor configured to:
     determine if a host vehicle is traveling on a ramp of a roadway, the ramp being an on-ramp or an off-ramp;
     responsive to a determination that the host vehicle is traveling on the ramp, determine a quantity of lanes of the ramp;
     select, based on the quantity of lanes of the ramp, a target selection scheme from among two or more potential selection schemes to be used to select a target of interest while the host vehicle is on the ramp, the two or more potential selection schemes including a general target selection scheme that is selected in response to the ramp having two or more lanes and a single-lane target selection scheme that is selected in response to the ramp having a single lane;
     determine, based on the selected target selection scheme, the target of interest for the host vehicle while on the ramp; and
     execute, based on the target of interest, one or more driving maneuvers of the host vehicle that assist in avoiding the target of interest;
     wherein the general target selection scheme is also used by the host vehicle to select targets of interest while the host vehicle is not traveling on the ramp of the roadway.

2. The system of claim 1, wherein the one or more driving maneuvers comprise:
   maintaining a set distance behind the target of interest;
   maintaining, based on a velocity of the target of interest, a set velocity; or
   braking based on the velocity of the target of interest decreasing.

3. The system of claim 1, wherein:
   the general target selection scheme configures the at least one processor to determine the target of interest by prioritizing a target that was immediately in front of the host vehicle and on a path of a heading of the host vehicle prior to the host vehicle transitioning to the ramp; and
   the single-lane target selection scheme configures the at least one processor to determine the target of interest by prioritizing a target that is immediately ahead of the host vehicle, regardless of whether the target is off or on the path of the heading of the host vehicle.

4. The system of claim 3, wherein the at least one processor is further configured to:
   responsive to the host vehicle exiting the ramp, select the general target selection scheme.

5. The system of claim 1, wherein the at least one processor is configured to determine the quantity of lanes based on information obtained from a map.

6. The system of claim 1, wherein the at least one processor is configured to execute the one or more driving maneuvers with an adaptive cruise control system.

7. The system of claim 1 wherein the general target selection scheme selects a vehicle traveling in a path of a heading of the host vehicle as the target of interest, and the single-lane target selection scheme selects a leading vehicle that is leading the host vehicle as the target of interest regardless of whether the leading vehicle is in the path of the heading of the host vehicle.

8. A computer-readable storage media comprising instructions that, when executed, configure at least one processor to:
   determine if a host vehicle is traveling on a ramp of a roadway, the ramp being an on-ramp or an off-ramp;
   responsive to a determination that the host vehicle is traveling on the ramp, determine a quantity of lanes of the ramp;
   select, based on the quantity of lanes of the ramp, a target selection scheme from among two or more potential selection schemes to be used to select a target of interest while the host vehicle is on the ramp, the two or more potential selection schemes including a general target selection scheme that is selected in response to the ramp having two or more lanes and a single-lane target selection scheme that is selected in response to the ramp having a single lane;
   determine, based on the selected target selection scheme, the target of interest for the host vehicle while on the ramp; and
   execute, based on the target of interest, one or more driving maneuvers of the host vehicle that assist in avoiding the target of interest;
   wherein the general target selection scheme is also used by the host vehicle to select targets of interest while the host vehicle is not traveling on the ramp of the roadway.

9. The computer-readable storage media of claim 8, wherein the one or more driving maneuvers comprise:
   maintaining a set distance behind the target of interest;
   maintaining, based on a velocity of the target of interest, a set velocity; or
   braking based on the velocity of the target of interest decreasing.

10. The computer-readable storage media of claim 8, wherein the instructions include:
   the general target selection scheme configures the at least one processor to determine the target of interest by prioritizing a target that is immediately in front of the host vehicle and on a path of a heading of the host vehicle; and
   the single-lane target selection scheme configures the at least one processor to determine the target of interest by prioritizing a target that is immediately ahead of the host vehicle, regardless of whether the target is off or on the path of the heading of the host vehicle.

11. The computer-readable storage media of claim 10, wherein the instructions, when executed, further configure the at least one processor to:
   responsive to the host vehicle exiting the ramp, select the general target selection scheme.

12. The computer-readable storage media of claim 8, wherein the instructions, when executed, configure the at least one processor to determine the quantity of lanes based on information obtained from a map.

13. The computer-readable storage media of claim 8, wherein the instructions, when executed, configure the at least one processor to execute the one or more driving maneuvers with an adaptive cruise control system.

14. The computer-readable storage media of claim 8, wherein the general target selection scheme selects a vehicle traveling in a path of a heading of the host vehicle as the target of interest, and the single-lane target selection scheme selects a leading vehicle that is leading the host vehicle as the target of interest regardless of whether the leading vehicle is in the path of the heading of the host vehicle.

15. A method comprising:
   determining if a host vehicle is traveling on a ramp of a roadway, the ramp being an on-ramp or an off-ramp;
   responsive to a determination that the host vehicle is traveling on the ramp, determining a quantity of lanes of the ramp;
   selecting, based on the quantity of lanes of the ramp, a target selection scheme from among two or more potential selection schemes to be used to select a target of interest while the host vehicle is on the ramp, the two or more potential selection schemes including a general target selection scheme that is selected in response to the ramp having two or more lanes and a single-lane target selection scheme that is selected in response to the ramp having a single lane;
   determining, based on the selected target selection scheme, the target of interest for the host vehicle while on the ramp; and
   executing, based on the target of interest, one or more driving maneuvers of the host vehicle that assist in avoiding the target of interest;
   wherein the general target selection scheme is also used by the host vehicle to select targets of interest while the host vehicle is not traveling on the ramp of the roadway.

16. The method of claim 15, wherein the one or more driving maneuvers comprise:
   maintaining a set distance behind the target of interest;
   maintaining, based on a velocity of the target of interest, a set velocity; or
   braking based on the velocity of the target of interest decreasing.

17. The method of claim 15, wherein the target selection scheme comprises one of:
   the general target selection scheme determines the target of interest by prioritizing a target that is immediately in front of the host vehicle and on a path of a heading of the host vehicle; or
   the single-lane target selection scheme that determines the target of interest by prioritizing a target that is immediately ahead of the host vehicle, regardless of whether the target is off or on the path of the heading of the host vehicle.

18. The method of claim 15, wherein determining the quantity of lanes is based on information obtained from a map.

19. The method of claim 15, wherein the one or more driving maneuvers is executed by an adaptive cruise control system.

20. The method of claim 15, wherein the general target selection scheme selects a vehicle traveling in a path of a heading of the host vehicle as the target of interest, and the single-lane target selection scheme selects a leading vehicle that is leading the host vehicle as the target of interest regardless of whether the leading vehicle is in the path of the heading of the host vehicle.

\* \* \* \* \*